June 27, 1950          J. F. HASSAY          2,513,172
ELECTRICAL SWITCH FOR MOTOR VEHICLES
Filed Feb. 13, 1948
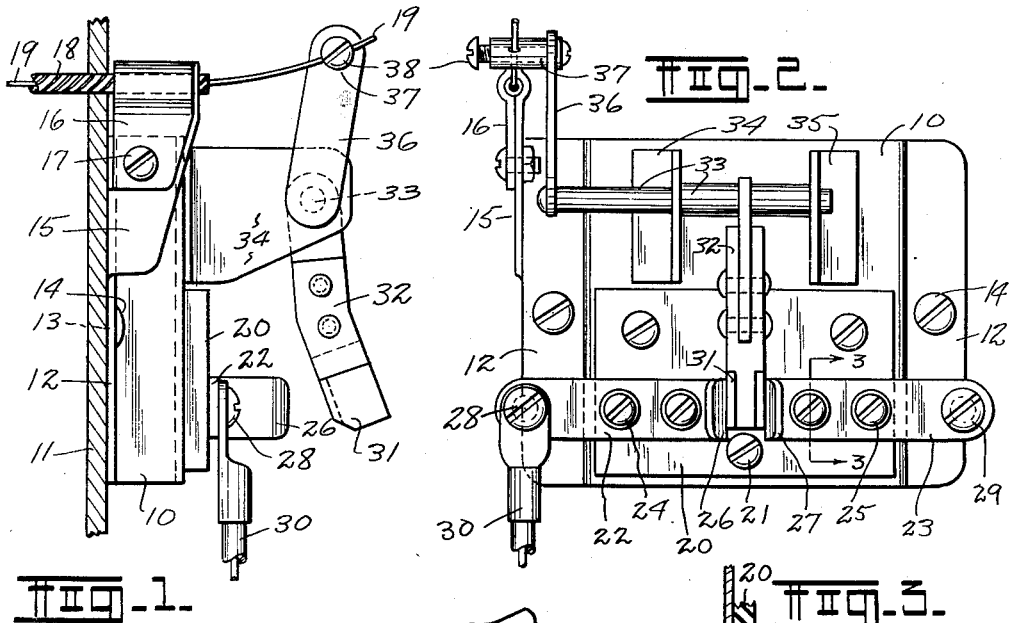
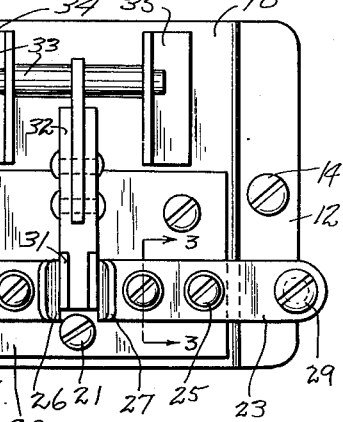
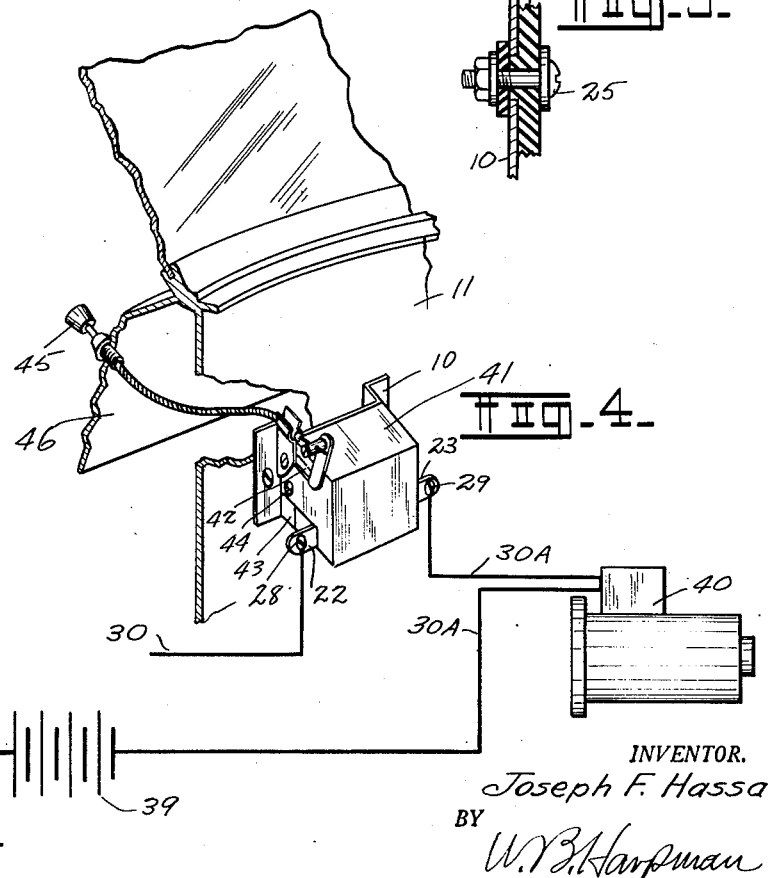
INVENTOR.
Joseph F. Hassay.
BY
W. B. Harpman
ATTORNEY.

Patented June 27, 1950

2,513,172

UNITED STATES PATENT OFFICE 2,513,172

ELECTRICAL SWITCH FOR MOTOR VEHICLES

Joseph F. Hassay, Campbell, Ohio

Application February 13, 1948, Serial No. 8,180

2 Claims. (Cl. 200—162)

1

This invention relates to motor vehicles in general and in particular to an electrical switch arranged to control all of the electrical circuits in a motor vehicle.

The principal object of the invention is the provision of an electrical switch arranged to control all of the electrical circuits of a motor vehicle.

A further object of the invention is the provision of an electrical switch having remotely situated control means.

A still further object of the invention is the provision of a master electrical switch forming suitable means for normally completing a main electrical circuit in a motor vehicle.

The electrical switch shown and described herein has been designed to enable the complete interruption of all electrical circuits on a motor vehicle at the will of the operator thereof to eliminate the fire hazard normally resulting from short circuits and the like in the electrical system of the motor vehicle. It is well known that it is common practice in motor vehicle construction to directly connect the battery with the starting motor by means of a cable extending from the battery to a terminal on the starting motor. This method is used in order to insure the adequate delivery of electric current from the battery to the starting motor. The various other electrical circuits on the motor vehicle are connected through an ammeter with the starting motor terminal and hence with the battery. Short circuits frequently occur in the various electrical circuits, many of which are not fused and it is common knowledge that such short circuits frequently cause the destruction of the motor vehicle by fire.

The present invention relates to an electrical switch which may be easily installed in the main electrical circuit between the starting motor terminal and the ammeter and/or additional terminal blocks thereof and be capable of operation to break the said main electrical circuit in the event of short circuits and the like and thereby act to save the motor vehicle so equipped from destruction by fire.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

2

The invention is illustrated in the accompanying drawing, wherein—

Figure 1 is a side view of the electrical switch showing the same in open position.

Figure 2 is a front view of the electrical switch showing the same in open position.

Figure 3 is an enlarged vertical section taken on line 3—3 of Figure 2 showing the detail of insulation and terminal mounting of the electrical switch.

Figure 4 is a perspective view of a fragmentary portion of a motor vehicle showing the electrical switch installed therein.

By referring to the drawings and Figures 1 and 2 in particular it will be seen that the electrical switch comprises a mounting base 10 preferably formed as a channel, as shown, and adapted to be affixed to a fire wall or bulkhead 11 of a motor vehicle on the motor side thereof at a point near the battery or starting motor. The mounting base 10 is flanged at 12 and openings 13 are formed in the flanges 12 through which fasteners 14 may be positioned so as to mount the switch on the fire wall 11. A portion of the mounting base 10 is formed as a bracket 15 which is adapted to carry a clamping member 16 adjustably secured thereto by a fastener 17 so that the sheath 18 of a flexible cable 19 may be secured to the switch.

A central raised area of the mounting base 10 carries a section of insulating material 20 which is secured thereto by a plurality of fasteners 21 and a pair of terminal strips 22 and 23 are secured to the insulating material 20 by fasteners 24 and 25, respectively. The innermost ends of the terminal strips 22 and 23 are spaced with respect to one another and upturned to form resilient terminal ends 26 and 27, respectively. The outermost ends of the terminal strips 22 and 23 are drilled and tapped and provided with connectors 28 and 29, respectively, which facilitate the attachment thereto of cables 30 and 30A, respectively, one of which is shown in Figures 1 and 2 of the drawings and two of which are shown in Figure 4 of the drawings.

In order that a circuit may be completed between the terminal strips 22 and 23, and more particularly between the terminal ends 26 and 27, a U-shaped contact 31 is mounted on an insulated arm 32 which in turn is provided with a transverse shaft 33 forming means for pivotally mounting the arm 32 with respect to a pair of brackets 34 and 35 which are mounted on the mounting base 10. One end of the transverse shaft 33 extends outwardly and is provided with a crank-like arm 36 having a rotatably positioned cable engaging member 37 positioned thereon. The flexible cable 19 is engaged in the cable engaging member 37 and held in desired relation thereto by means of a set screw 38 as best shown in Figure 2 of the drawings. It will thus be seen that when movement is imparted to the flexible cable 19, the arm 36 is moved which imparts a partial rotary action to the transverse shaft 33 and thereby causes the arm 32 to move the U-shaped contact 31 into or out of engagement with the terminal ends 26 and 27, thus making or breaking an electrical circuit in connection with the terminal strips 22 and 23.

By referring to Figure 4 of the drawings it will be seen that when the electrical switch is mounted on the fire wall 11 and the cable 30 connected to the ammeter and/or additional terminal blocks (not shown) which are in turn connected with all of the electrical circuits in the motor vehicle, and the connector 29 connected to the cable 30A which connects with the battery 39 by way of a terminal on a starting motor 40, the electrical switch will be in a position to control all of the electrical circuits in the motor vehicle as the main electrical circuits are established as long as the U-shaped contact 31 is closed and broken when the U-shaped contact 31 is opened. It will be seen that the switch is provided with a cover 41 which is slotted at 42 and 43 to enable it to be positioned over the shaft 33 and the terminal strips 22 and 23 and normally secured to the mounting base 10 by means of a screw 44.

In the event of a short circuit occurring in the main circuit wires connected with the switch, the flexible cable 19 may be moved by a remote control knob 45 located on the dashboard 46 of the motor vehicle and thereby completely disconnect all of the said electrical circuits. An example of such operation may be found in a short in the horn wire which frequently occurs in motor vehicles resulting in the annoying sounding of the horn. With the disclosed electrical switch installed, the various electrical circuits may be disconnected at the will of the operator and the short circuit repaired. It will be seen that the electrical switch in no way affects the normal operation of the electrical circuits of the motor vehicle as it is of heavy construction and capable of carrying the full amperage of the various electric circuits.

It will also be seen that the electrical switch disclosed herein meets the several objects of the invention in that a simple and inexpensive device has been disclosed which will enable the complete disconnection of the motor vehicle electrical circuits thereby eliminating the possible destruction of the motor vehicle by fire.

Having thus described my invention, what I claim is:

1. In an electrical switch for controlling a main electrical circuit of a motor vehicle and having a mounting base for installation on a fire wall of the said motor vehicle; a pair of terminal strips mounted in oppositely disposed end to end relation on said base and insulated therefrom, the inner ends of the said terminal strips being outturned and spaced with respect to one another and the outer ends of the said strips having connectors formed thereon, and a transversely positioned shaft on said base and an arm of insulating material affixed thereto, and a U-shaped conductor member clamped on said arm and engageable therebetween the said outturned ends of the said contact strips to complete an electrical circuit therebetween, and remotely situated means for partially rotating the said transverse shaft to move the said arm so that the said switch may be opened and closed thereby.

2. In an electrical switch for controlling a main electrical circuit of a motor vehicle and having a mounting base for installation on a fire wall of the said motor vehicle; a pair of L-shaped terminal strips mounted in oppositely disposed end to end relation on said base and insulated therefrom, the short ends of the said L-shaped terminal strips being outturned and closely spaced with respect to one another and the long ends of the said L-shaped strips having connectors formed thereon, and a transversely positioned shaft on said base and an arm of insulating material affixed thereto for arcuate movement based thereon, and a U-shaped conductor member clamped about the end of said arm and engageable between the said outturned ends of the said contact strips to complete an electrical circuit therebetween, a crank on one end of said shaft and a flexible cable secured to said crank and comprising means for moving the said shaft, arm and U-shaped contact member so as to make or break an electrical circuit connected to the said terminal strips.

JOSEPH F. HASSAY.

REFERENCES CITED

The following references are of record in the file of this patent:

UNITED STATES PATENTS

| Number | Name | Date |
|---|---|---|
| 1,206,552 | Leece | Nov. 28, 1916 |
| 1,889,515 | Hammerly | Nov. 29, 1932 |
| 1,995,946 | Schild | Mar. 26, 1935 |
| 2,277,671 | Williams et al. | Mar. 31, 1942 |
| 2,458,930 | Crooke | Jan. 11, 1949 |